United States Patent [19]
Burns

[11] Patent Number: 5,865,628
[45] Date of Patent: Feb. 2, 1999

[54] STORM MAPPING SYSTEM

[76] Inventor: Peggy A. Burns, 829 Clarence Dr., Callaway, Fla. 32404

[21] Appl. No.: 901,616

[22] Filed: Jul. 28, 1997

[51] Int. Cl.[6] ................................................. G09B 29/00
[52] U.S. Cl. ........................... 434/217; 434/150; 434/153
[58] Field of Search .................................. 434/217, 150, 434/408, 430, 153

[56] References Cited

U.S. PATENT DOCUMENTS

| | | | |
|---|---|---|---|
| 1,002,851 | 9/1911 | Kullmer | 434/217 |
| 2,431,827 | 12/1947 | Rado | 434/153 |
| 3,363,902 | 1/1968 | Jones | 434/150 |
| 3,755,938 | 9/1973 | Bytwork | 434/430 |
| 4,250,642 | 2/1981 | Riehle | 434/150 |
| 4,251,930 | 2/1981 | Laver | 434/106 |
| 4,402,672 | 9/1983 | Lowe, Jr. | 434/217 |
| 4,584,223 | 4/1986 | Krapf | 434/430 |
| 4,641,440 | 2/1987 | Agranov | 40/10 |
| 4,896,888 | 1/1990 | Owen | 273/240 |
| 4,902,017 | 2/1990 | Grammatico | 273/240 |
| 5,139,266 | 8/1992 | Mullins et al. | 273/240 |
| 5,259,763 | 11/1993 | Wendel et al. | 434/150 |
| 5,263,866 | 11/1993 | Campbell | 434/408 |
| 5,382,562 | 1/1995 | Hutten | 503/227 |
| 5,533,902 | 7/1996 | Miller | 434/430 |
| 5,562,460 | 10/1996 | Price | 434/150 |

Primary Examiner—Paul J. Hirsch
Attorney, Agent, or Firm—Peter Loffler

[57] ABSTRACT

A storm mapping system is used to track the location, path, and strength of a storm. The system is comprised of an erasable marker-board surface having a map and a chart permanently immobilized thereon. The map is of any desired geographic region and may have additional map features, such as longitude and latitude lines, distance scale, hurricane category chart, and geographic names thereon. The chart is a table member having columns for date, time, latitude & longitude, wind speed, wind direction, and barometric pressure, in inches of mercury, millibars or both. At least one token representing a storm, is removably attachable to the map in any desired fashion. The token is attached to the map in order to visually locate a storm thereon and a path line may be drawn on the map for historical tracking of the storm. Information about the storm is entered into the chart at desired time intervals.

20 Claims, 3 Drawing Sheets

STORM MAPPING SYSTEM

BACKGROUND OF THE INVENTION

1. Field of the Invention

The present invention relates to a system capable of locating and tracking hurricanes and tropical storms and retaining information about the storms.

2. Background of the Prior Art

Hurricanes are one of nature's most furious and destructive displays of force. However, unlike other natural disasters—earthquakes and tornadoes for example—the hurricane tends to give a relatively large warning time period before striking. This advance warning gives potential victims lying in the storm's path sufficient time to make appropriate preparations. As the path of a hurricane is unpredictable, it is necessary to track a hurricane's progression in order to properly determine the probable land fall of the incoming storm. This tracking can take several days.

Typically, the United States National Weather Service (or similar counterpart in other nations) provides regular updates of a storm's path and gives other vital information about the storm. Historical tracking, via some form of graphic display is also typically provided. In order to make an informed decision about a course of action, a person will want to gather and store the information about the storm. The typical method of information storage is to continually plot the hurricane's progress on a paper map and to keep the other vital storm information on the back of the map or on a separate notepad. This system achieves its purpose of information storage but can become messy, especially for a storm that frequently changes course or retraces part of its travel path. Furthermore, it can become relatively difficult to properly extract information from the system.

Therefore, there is a need in the art for a system that will assist the average person in locating and tracking a storm and for storing information about the storm in a neat, organized, and relatively compact fashion. The system must store all vital information regarding the storm and should provide ease of information retrieval. The system should be of simple design and should be easy to use.

SUMMARY OF THE INVENTION

The storm mapping system of the present invention addresses the aforementioned needs in the art. The hurricane mapping system allows a person to readily track a storm through its entire path, pinpoint its location, and maintain information both historic and current, about the storm.

The storm mapping system is comprised of a board member having an erasable marker-board type top surface which can receive marks from appropriate markers and thereafter the marks can be readily removed. A map is permanently imposed on the board member. The map is of any desired location and can have lines of longitude and latitude, a mileage scale, a storm category chart, and names of various places and geographic locations thereon. The storm category chart has the category, the expected damage, the wind speed range and the tidal surge for each of the five categories of hurricanes, as provided by the United States National Weather Service. Alternately, this chart can categorize hurricanes and tropical storms using any other categorizing system.

An information chart is also located on the board. The chart has columns for date, time, latitude & longitude, wind direction, wind speed, and barometric pressure in inches of mercury, millibars, or both, and the chart has multiple row entries. At least one token representing a storm is removably attachable to the map, either magnetically, adhesively or otherwise.

In order to track a storm, the token is placed onto the map at the storm's current position. As the storm moves, the token is also moved to reflect the revised position of the storm. A line can be drawn onto the map to reflect the progress of the storm as it moves. The map gives a user a quick and clear visual picture of the storm's progress and location. The vital information about the storm is entered into the chart at desired intervals, one row entry for each interval. The information in the chart gives the user vital data on the storm including whether the storm is strengthening or weakening.

The storm mapping system of the present invention is an easy to use device that accurately tracks and locates a storm giving, a person necessary information in order to decide on how to deal with the storm. The device is of simple and straightforward design and construction and is easy to use.

BRIEF DESCRIPTION OF THE DRAWINGS

Similar reference numerals refer to similar parts throughout the several views of the drawings.

DESCRIPTION OF THE PREFERRED EMBODIMENT

Figure 1:
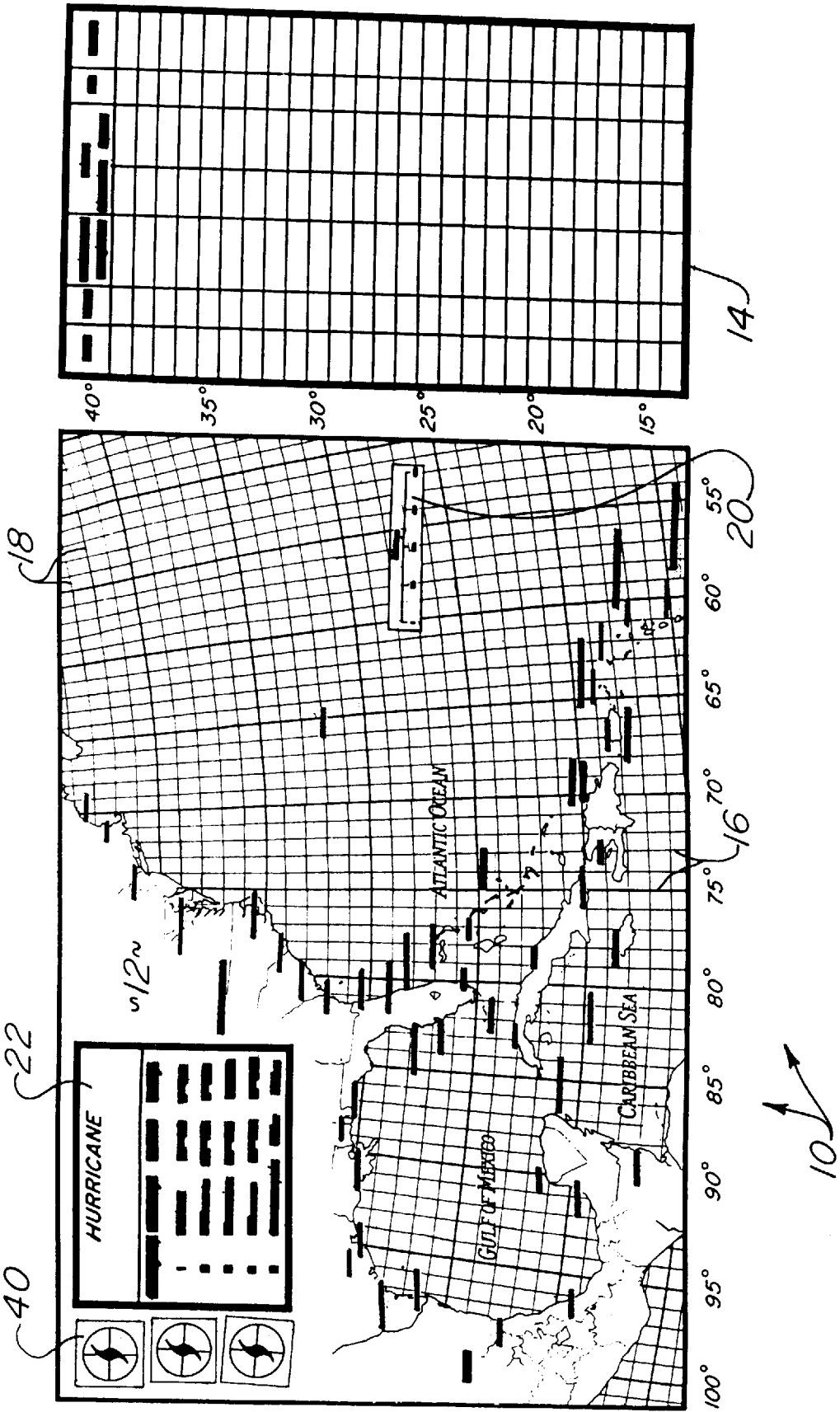
FIG. 1 is a top plan view of the storm mapping system of the present invention.
Figure 2:
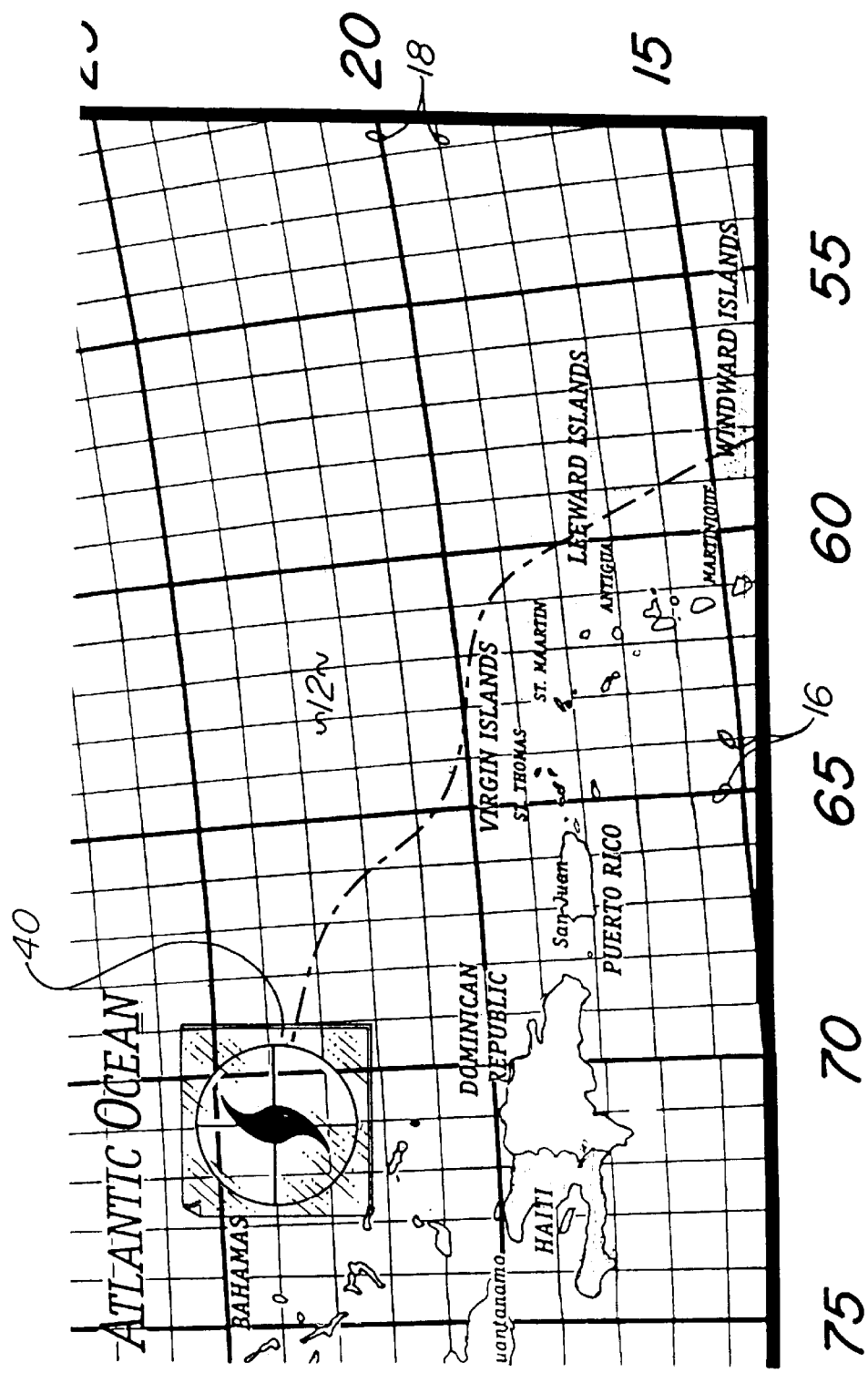
FIG. 2 is a close-up view of a portion of the storm mapping system illustrated in FIG. 1.
Figures 3A, 3B, 3C:
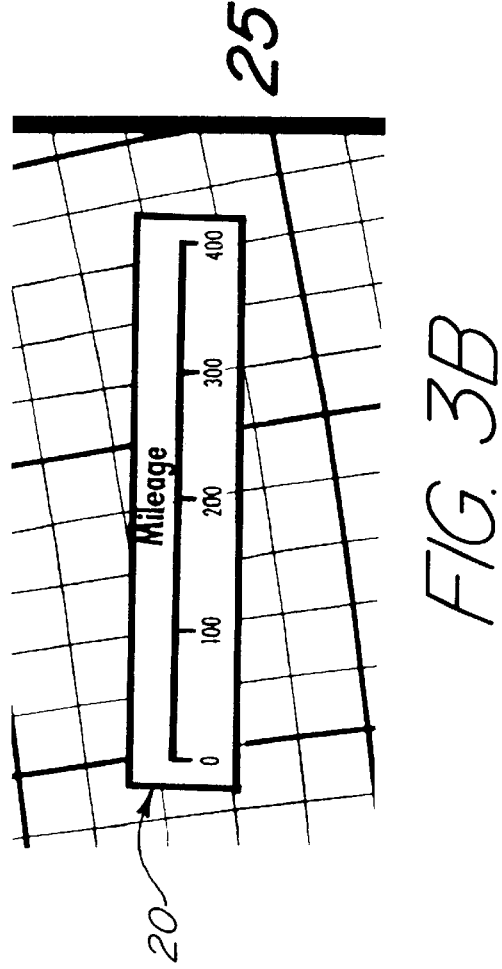
FIG. 3A is a close-up view of the hurricane legend used with the storm mapping system.
FIG. 3B is a close-up view of the chart legend used with the storm mapping system.
FIG. 3C is a close-up view of the distance scale used with the storm mapping system.

Referring now to the drawings, it is seen that the storm mapping system of the present invention, generally denoted by reference numeral 10, is comprised of a generally flat board member having a map image 12 and a chart image 14 on the top surface. Advantageously, the top surface of the board member will be an erasable marker-board surface of any type well known in the art with the map 12 and the chart 14 permanently immobilized on the erasable marker-board surface. The surface may or may not be capable of magnetically holding a token thereon. The board member may be adapted to be hung on a wall or positioned on a desk top in raised fashion.

As seen, the map 12 displays a desired geographic area, which area tends to be subject to hurricanes and tropical storms. Ideally, lines of latitude 16 and lines of longitude 18 will be positioned on the map, at least over water masses. Geographic labeling of any desired detail will also be on the map. A distance scale 20 can also be located on the map. A storm category chart 22 can be superimposed on a portion of the map 12 or elsewhere on the top surface, if desired.

As further seen, the chart 14 is a two-dimensional table member having a plurality of labels for each column category. These categories include: date 24, time 26, latitude & longitude 28, winds 30 with sub-categories for direction 32 and speed 34, and barometric pressure measured in millibars 36, inches of mercury 38, or both. These categories store the required information about a particular storm. If desired, the latitude & longitude category 28 can be split into two sperate categories.

At least one token 40, having a symbol representing a tropical storm on its top surface, is provided. This token 40 is adapted to be removably attachable to the board's surface. This removable attachment can be achieved by providing an adhesive layer on the bottom surface of the token 40. Alternately, the bottom surface of the token 40 may be magnetic enabling it to be magnetically attachable to the board surface. If desired more than one token 40 can be provided, with each token 40 being of a different size, in order to represent storms of different sizes or strengths. Furthermore, multiple tokens 40 of either the same or different sizes and strengths can be used to track multiple storms occurring simultaneously within a given geographic area.

Alternately, the storm symbol can be drawn directly onto the board surface.

In order to utilize the storm mapping system 10 of the present invention, a person receives storm information from any appropriate source. A token 40 is placed onto the map at the storm's last reported position. The latitude and longitude, the wind speed and wind direction, and the barometric pressure of the storm are all entered into the appropriate column within the chart 14 with the appropriate date and time mark. An appropriate erasable marker (not illustrated) of any type known in the art is used to enter the information into the chart 14. In time, as new information about the storm is received, the token 40 is repositioned to the new storm position. If different size tokens 40 are utilized, the token 40 can be replaced with a different sized token whenever the size or strength change of the storm so warrant. If desired, a line can be drawn onto the map representing the storm's path. The same erasable marker is used to draw the line. The new information is entered in the next available row of the chart 14.

This process continues and over time the person tracking the storm will have a strong picture, both visual and data based, from which to make an informed decision. The person will be able to see the history of the storm, including the storm's path and its strengthening or weakening tendencies. The person will be able to make an informed decision about possible land fall location and the strength of the storm at land fall. From this information, the person may decide whether to evacuate or stay put. The storm category chart 22 located on the top surface may provide the person a further reminder relating to an evacuate decision.

After the storm has passed, the information in the chart 14 and the path line on the map 12 are erased and the token 40 is positioned aside, making the system 10 ready for tracking of the next storm.

While the invention has been particularly shown and described with reference to an embodiment thereof, it will be appreciated by those skilled in the art that various changes in form and detail may be made without departing from the spirit and scope of the invention.

I claim:

1. A storm tracking system comprising:
   a board having a bottom surface and a top surface, the top surface adapted to receive erasable ink thereon;
   a map image, permanently immobilized on the top surface;
   at least one token removably attachable to the top surface upon the map image in corresponding relationship to a position of the storm; and
   a chart image, permanently immobilized on the top surface, having a plurality of rows and a plurality of columns, the columns having a plurality of labels, one each of the plurality of labels positioned at the top of each of the plurality of columns, such that each row receives information about the storm via an erasable ink marker.

2. The storm tracking system as in claim 1 wherein the plurality of labels comprise:
   a date label;
   a time label;
   a position label;
   a wind direction label; and
   a wind speed label.

3. The storm tracking system as in claim 2 further comprising at least one barometric pressure label.

4. The storm tracking system as in claim 3 wherein the barometric pressure label is in millibars.

5. The storm tracking system as in claim 3 wherein the barometric pressure label is in inches.

6. The storm tracking system as in claim 3 wherein the barometric pressure label is in millibars and in inches.

7. The storm tracking system as in claim 1 further comprising a storm category legend permanently immobilized on the top surface for relating the information within a row with the legend.

8. The storm tracking system as in claim 1 further comprising a distance legend permanently immobilized on the top surface for measuring the distance traveled by the storm.

9. The storm tracking system as in claim 1 further comprising
   at least one line of longitude permanently immobilized on the top surface;
   at least one line of latitude permanently immobilized on the top surface; and
   wherein each of the at least one line of longitude and at least one line of latitude assist in the placement of the token upon the map image.

10. The storm tracking system as in claim 1 wherein the at least one token is magnetically attachable to the top surface.

11. The storm tracking system as in claim 1 wherein the at least one token is adhesively attachable to the top surface.

12. A method for tracking a storm comprising the steps of:
    providing a board having a bottom surface and a top surface, the top surface adapted to receive erasable ink thereon;
    providing a map image, permanently immobilized on the top surface;
    placing at least one token upon the map image in corresponding relationship to a position of the storm; and
    providing a chart image, permanently immobilized on the top surface, having a plurality of rows and a plurality of columns, the columns having a plurality of labels, one each of the plurality of labels positioned at the top of each of the plurality of columns; and
    entering information about the storm into one of the rows via an erasable ink marker.

13. The method as in claim 12 wherein the plurality of labels comprise:
    a date label;
    a time label;
    a position label;
    a wind direction label; and
    a wind speed label.

14. The method as in claim 13 further comprising at least one barometric pressure label.

15. The method as in claim 14 wherein the barometric pressure label is in millibars.

16. The method as in claim 14 wherein the barometric pressure label is in inches.

17. The method as in claim 12 further comprising the step of providing a storm category legend permanently immobilized on the top surface.

18. The method as in claim 12 further comprising the step of providing a distance legend permanently immobilized on the top surface.

19. The method as in claim 12 further comprising the steps of:

provinding at least one line of longitude permanently immobilized on the top surface; and providing at least one line of latitude permanently immobilized on the top surface.

20. The method as in claim 12 wherein the at least one token is magnetically attachable to the top surface.

* * * * *